United States Patent [19]
Ogawa

[11] Patent Number: 5,490,224
[45] Date of Patent: Feb. 6, 1996

[54] FEATURE EXTRACTING APPARATUS

[75] Inventor: Masami Ogawa, Tokyo, Japan

[73] Assignee: Canon Kabushiki Kaisha, Tokyo, Japan

[21] Appl. No.: 283,143

[22] Filed: Aug. 1, 1994

Related U.S. Application Data

[63] Continuation of Ser. No. 765,500, Sep. 26, 1991, abandoned, which is a continuation of Ser. No. 433,603, Nov. 8, 1989, abandoned.

[30] Foreign Application Priority Data

Nov. 11, 1988 [JP] Japan .................. 63-283874

[51] Int. Cl.⁶ ........................... G06K 9/56
[52] U.S. Cl. ........................... 382/205; 382/260
[58] Field of Search ............. 382/21, 27, 19, 382/41, 54, 197, 205, 195, 276, 302, 254, 260, 192

[56] References Cited

U.S. PATENT DOCUMENTS

| | | | |
|---|---|---|---|
| 3,899,771 | 8/1975 | Saraga et al. | 382/21 |
| 3,968,475 | 7/1976 | McMahon | 382/21 |
| 3,979,722 | 9/1976 | Sakoe | 382/21 |
| 4,003,024 | 1/1977 | Riganati | 382/54 |
| 4,040,009 | 8/1977 | Kadota et al. | 382/21 |
| 4,075,698 | 2/1978 | Code | 364/483 |
| 4,151,512 | 4/1979 | Riganati et al. | 382/21 |
| 4,506,382 | 3/1985 | Hada et al. | 382/27 |
| 4,630,306 | 12/1986 | West et al. | 382/21 |
| 4,805,226 | 2/1986 | Guebey | 382/27 |
| 4,962,542 | 10/1990 | Klees | 382/27 |

FOREIGN PATENT DOCUMENTS 2116414 12/1971 Germany.

OTHER PUBLICATIONS

Lee, "Digital Circuits and Logic Design", 1977, p. 576, Prentice Hall Inc.
"Implementation of Cellular–Logic Operator Using 3*3 Convolution and Table Lookup Hardware", Computer, Vision, Graphics & Image Processing, vol. 27, No. 1, pp. 115–123.

Primary Examiner—Joseph Mancuso
Attorney, Agent, or Firm—Fitzpatrick, Cella, Harper & Scinto

[57] ABSTRACT

This invention provides a feature extracting circuit including a shift register section arranged to store an image for a predetermined number of lines, the image consisting of a predetermined number of bits, and then to shift the image; a look-up table section for transforming a set of partial image data for a predetermined number of pixels supplied from the shift register section into a direction index and then for outputting the direction index; and a counter section for counting the direction index output from the look-up table section. The feature extracting circuit receives a binary digital image and extracts, as a feature of the image, a direction index which indicates the direction in which the boundary between adjacent black and white pixels extends.

15 Claims, 12 Drawing Sheets

| | | | |
|---|---|---|---|
| $P_0$ | $P_1$ | $P_2$ | $P_3$ |
| $P_4$ | $P_5$ | $P_6$ | $P_7$ |
| $P_8$ | $P_9$ | $P_{10}$ | $P_{11}$ |
| $P_{12}$ | $P_{13}$ | $P_{14}$ | $P_{15}$ |

| DIRECTION INDEX | ADDED DATA | COUNTER | | | | | |
|---|---|---|---|---|---|---|---|
| | | 8 | 9 | 10 | 11 | 12 | 13 |
| 0 | 1 | 1 | 0 | 0 | 0 | 0 | 0 |
| 1 | 1 | 0 | 1 | 0 | 0 | 0 | 0 |
| 1 | 2 | 0 | 1 | 1 | 0 | 0 | 0 |
| 2 | 1 | 0 | 0 | 0 | 1 | 0 | 0 |
| 3 | 1 | 0 | 0 | 0 | 0 | 1 | 0 |
| 3 | 2 | 1 | 0 | 0 | 0 | 1 | 1 |
| OTHER THAN ABOVE | 0 | 0 | 0 | 0 | 0 | 0 | 0 |

1 : COUNT UP
0 : NOTHING IS DONE

FEATURE EXTRACTING APPARATUS

This application is a continuation of application Ser. No. 07/765,500 filed Sep. 26, 1991, which was a continuation of application Ser. No. 07/433,603 filed Nov. 8, 1989, both now abandoned.

BACKGROUND OF THE INVENTION

1. Field of the Invention

The present invention relates generally to feature extracting circuits and, more particularly, to a figure extracting circuit arranged to effect feature extraction on an image by counting direction indices relating to the outline of a binary digital image.

2. Description of the Related Art

Image recognition apparatus of the type used for character recognition, pattern recognition or the like are commonly arranged to perform the process of calculating the "feature amount" of an image. In one known method, the direction of an outline which defines a particular black-pixel component (or area) is detected as the feature amount. An optical character reader (OCR) of the conventional type which employs the known method will be described below.

For example, in the OCR shown in FIG. 2, a document to be recognized is inputted through an image scanner 5 and the resulting digitized image is stored in a RAM 3 by means of an I/O control section 4. Then, a CPU 1 calculates the feature amount of the image stored in the RAM 3 in accordance with the programs stored in a ROM 2. The image stored in the form of a RAM 3 assumes the two-dimensional matrix as shown in FIG. 3. In the matrix of the input image, the X coordinate axis extends from the uppermost left position (as viewed in FIG. 3) to the right in the horizontal direction, while the Y coordinate axis extends from the same position to the bottom in the vertical direction. If the color of a particular read pixel is black, the value "1" is placed at the corresponding pixel position in the matrix, while if the color is white, the value "0" is place at the corresponding pixel position.

After the image has been stored in the RAM 3, the CPU 1 effects a filtering process. The filtering process means a process for removing noise from an image input by the image scanner 5, a process for correcting, as shown in FIG. 4, a portion 31 which includes the part of an outline which was originally smooth but was notched during digitization by the image scanner 5, thereby providing a portion 32 which includes the part thus corrected, or other similar processes.

The algorithm of this filtering process is explained with reference to FIG. 6. In the following explanation, it is assumed that an input image has a width of 63 pixels and a height of 63 pixels and that P (x, y) represents the value of a pixel positioned at coordinates (x, y).

The following process is repeated for each value of y (y=2, 3 . . . , and 62). For x=2 the value of the pixel positioned at coordinates (2, 2) is calculated from the values of eight neighboring pixels by using the following equation.

$$Q(x,y) = \left( 0.11 \times \sum_{i=0}^{8} P_i \right) // 0.5$$

where $P_i$ ($P_0$, $P_1$, . . . , $P_8$) represents each point shown in FIG. 5; $P_0$=P(x, y); $P_1$=P(x+1, y); $P_2$=P(x+1, y−1); $P_3$=P(x, y−1); $P_4$=P(x−1, y−1); $P_5$=P(x−1, y); $P_6$=P(x−1, y+1); $P_7$=P(x, y+1); and $P_8$=P(x+1, y+1). "//" represents that after dividing by the divisor (0.5, here), the figures to the right of the decimal point are omitted from the quotient. More specifically, of a total of nine pixels, i.e., one particular pixel P(x, y) and eight pixels which neighbor on this pixel, if at least five pixels are black, the pixels assume the same array as that corresponding to Q(x, y).

Once the filtering process is completed, then a direction index is calculated. The direction index is a value which, as shown in FIG. 8, indicates the direction of the boundary between adjacent black and white pixels. As shown by the patterns of FIG. 9, the direction index "0" indicates that the boundary runs in the horizontal direction, index "1" indicates that the boundary is located in the upper right side or the lower left side, the direction index "2" indicates that the boundary runs in the vertical direction, and the direction index "3" indicates that the boundary is located in the lower right side or the upper left side. In other words, the direction index of the pixel P(x, y) is calculated from a total of four pixels, i.e., the three neighboring pixels P(x+1, y), P(x, y+1) and p(x+1, y+1) as well as the pixel P(x, y) of interest.

The feature amount of a character of interest is determined in accordance with how many outline portions indicated by the individual direction indexes "0", "1", "2" and "3" are contained in the character. For example, since the patterns 91 and 92 shown in FIG. 9 each include two outlines, the number of outlines counted needs to be two. For this purpose, added data is obtained which determines whether the number of outlines counted is one or two. Of the patterns shown in FIG. 9, the patterns 91 and 92 each correspond to added data "2", while the other patterns correspond to added data "1". If there is no pattern similar to any of the patterns of FIG. 9, it indicates that no outline is present, and the corresponding added data is set to "0".

An algorithm for calculating such a direction index is explained with reference to the flow charts of FIGS. 10A and 10B. In Step S101, the vertical coordinate y is initialized with "1", and in Step S102 the horizontal coordinate x is initialized with "1". Then, in Step S103, the values Q (1, 1), Q(2, 1), Q(1, 2) and Q(2, 2) of individual coordinates (1, 1), (2, 1), (1, 2) and (2, 2) are read from image data Q to which a filtering process has been applied, and these values Q (1, 1), Q(2, 1), Q(1, 2) and Q(2, 2) are set as $Q_1$, $Q_2$, $Q_3$ and $Q_4$, respectively.

If $Q_1$=1, $Q_2$=1, $Q_3$=0 and $Q_4$=0, the process proceeds from Step S104 to Step S106, where a direction index H (1, 1) is set to 0 with added data D(1, 1) set to 1.

If $Q_1$=0, $Q_2$=0, $Q_3$=1 and $Q_4$=1, the process proceeds from Step S105 to Step S106, where a direction index H (1, 1) is set to 0 with added data D(1, 1) set to 1.

If $Q_1$=0, $Q_2$=1, $Q_3$=1 and $Q_4$=1, the process proceeds from Step S107 to Step S109, where the direction index H (1, 1) is set to 1 with the added data D(1, 1) set to 1.

If $Q_1$=1, $Q_2$=1, $Q_3$=1 and $Q_4$=0, the process proceeds from Step S108 to Step S109, where the direction index H (1, 1) is set to 1 with the added data D(1, 1) set to 1.

If $Q_1$=0, $Q_2$=1, $Q_3$=1 and $Q_4$=0, the process proceeds from Step S110 to Step S111, where the direction index H (1, 1) is set to 1 with the added data D(1, 1) set to 2.

If $Q_1$=0, $Q_2$=1, $Q_3$=0 and $Q_4$=1, the process proceeds from Step S112 to Step S114, where the direction index H (1, 1) is set to 2 with the added data D(1, 1) set to 1.

If $Q_1$=1, $Q_2$=0, $Q_3$=1 and $Q_4$=0, the process proceeds from Step S113 to Step S114, where the direction index H (1, 1) is set to 2 with the added data D(1, 1) set to 1.

If $Q_1$=1, $Q_2$=0, $Q_3$=1 and $Q_4$=1, the process proceeds from Step S115 to Step S117, where the direction index H (1, 1) is set to 3 with the added data D(1, 1) set to 1.

If $Q_1=1$, $Q_2=1$, $Q_3=0$ and $Q_4=1$, the process proceeds from Step S116 to Step S117, where the direction index H (1, 1) is set to 3 with the added data D(1, 1) set to 1.

If $Q_1=1$, $Q_2=0$, $Q_3=0$ and $Q_4=1$, the process proceeds from Step S118 to Step S119, where the direction index H (1, 1) is set to 3 with the added data D(1, 1) set to 2.

If none of the above conditions is satisfied, it indicates that no outline is detected. Accordingly, the process proceeds to Step S120, where the added data D (1, 1) is set to "0".

Then, in Step S121, the value of the horizontal coordinate x is counted up by one and the process returns to Step S103, where the above-described process is performed. This process is repeated until the value of the horizontal coordinate x reaches 62. When 62 is reached, the process proceeds to Step S123, where the value of the vertical coordinate y is counted up by one. Until the value of the vertical coordinate y reaches 62, the process sequentially returns to Step S102, and similar processes are performed with respect to the vertical coordinate y (=2, 3, ..., 62).

When all these processes have been completed, 62×62 direction indexes which consist of H(1, 1), H(2, 1), ..., H(62, 1), and H(1, 2), ..., H(62, 62) as well as 62×62 pieces of added data which consist of D(1, 1), D(2, 1), ..., D(62, 1), and D(1, 2), ..., D(62, 62) are obtained.

In the conventional method described above, however, the program requires several hundred process steps. Accordingly, the calculation time per pixel reaches several hundred μsec. or thereabouts and it is therefore impossible to realize the speeds at which recognition processing is effected in practice.

SUMMARY OF THE INVENTION

It is therefore an object of the present invention to provide a feature extracting circuit in which it is possible to eliminate the problems of the above-described conventional apparatus.

It is another object of the present invention to provide a feature extracting circuit capable of extracting the feature of an image at improved speeds.

To achieve the above objects, in accordance with the present invention, there is provided a feature extracting circuit arranged to receive a binary digital image and then to extract as a feature of the image a direction index which indicates the direction in which the boundary between adjacent black and white pixels extends. This feature extracting circuit is provided with a shift register portion arranged to store an image for a predetermined number of lines (rows), the image consisting of a predetermined number of bits, and then to shift the image; a look-up table portion for transforming a set of partial image data for a predetermined number of pixels supplied form the shift register portion into a direction index and then for outputting the direction index; and a counter portion for counting the direction index output from the look-up table.

In accordance with the present invention, it is possible to provide a feature extracting circuit capable of effecting feature extraction of an image at improved speeds.

DESCRIPTION OF THE PREFERRED EMBODIMENTS

Embodiments of the present invention will be explained in detail below with reference to the accompanying drawings.

Figure 1:
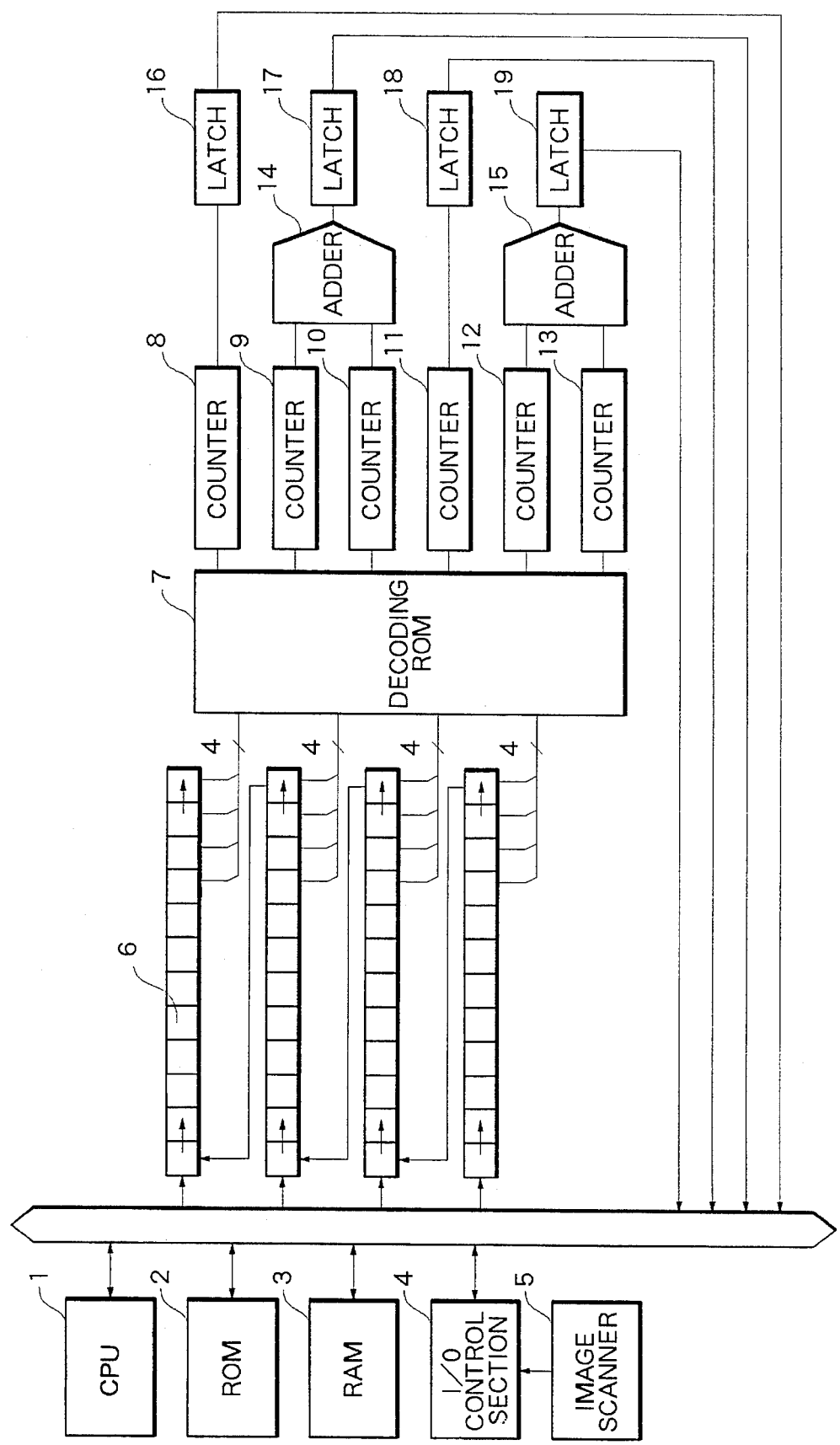
FIG. 1 is a block diagram showing an image processing apparatus to which one embodiment of a feature extracting circuit according to the present invention is applied.
Figure 2:
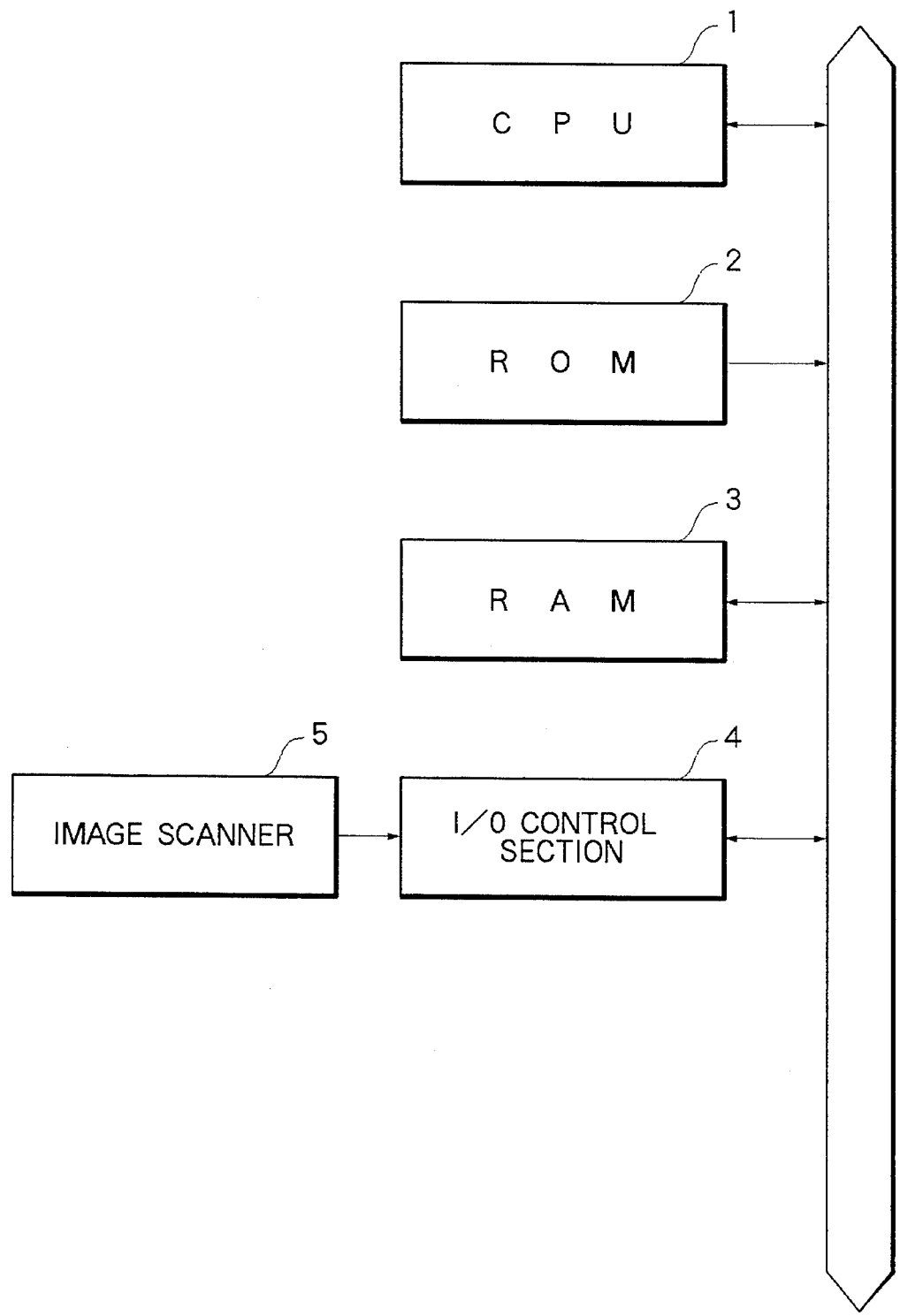
FIG. 2 is a block diagram showing a conventional type of image processing apparatus.
Figure 3:
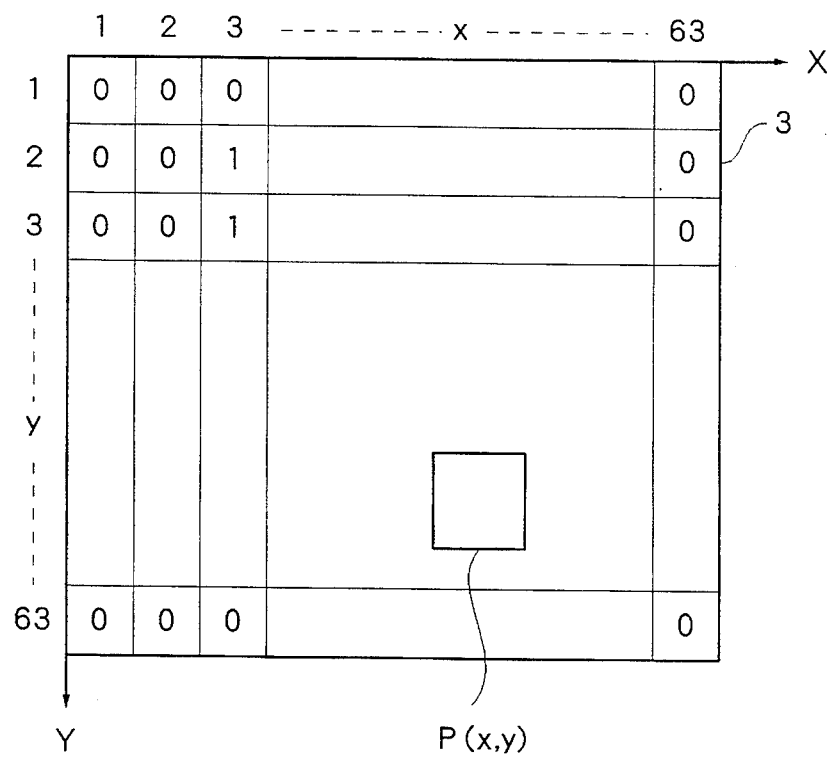
FIG. 3 is a view showing the logic structure of the image data stored in a RAM.

FIG. 1 is a block diagram showing an optical character reader ("OCR") in which one embodiment of a feature extracting circuit according to the present invention is applied. The illustrated OCR includes a CPU 1 for controlling all the elements of the OCR, a ROM 2 which stores a set of programs to be executed by the CPU 1, a RAM 3 which stores a set of input data representing characters, patterns or other images and a set of feature data associated therewith, an I/O control section 4 to which is connected an image scanner 5 for use in inputting image information such as a document, a photograph or the like, a set of shift registers 6 which are arranged to sequentially store images each consisting of 4×4 pixels, a decoding ROM 7 for outputting a counter enable signal corresponding to a direction index and added data associated with each particular 4×4 pixel array, counters 8–13 for counting the outputs from the decoding ROM 7, an adder 14 for adding the values of the counters 9 and 10, an adder 15 for adding the values of the counters 12 and 13, latches 16 and 18 for holding the outputs from the respective counters 8 and 11, and latches 17 and 19 for holding the outputs from the respective adders 14 and 15.

The following is an explanation of the writing of data to a blank ROM to make the decoding ROM 7. The decoding ROM 7 needs to satisfy the condition: input 16 bits and output 16 bits; and, for example, a large capacity ROM such as 27512, 271024 or the like (manufactured by Fujitsu, Ltd.)

may also be employed. The decoding ROM 7 receives a 4×4 pixel array, selects an appropriate counter from among the counters 8–13, and outputs a counter enable signal to the selected counter.

Figure 4:
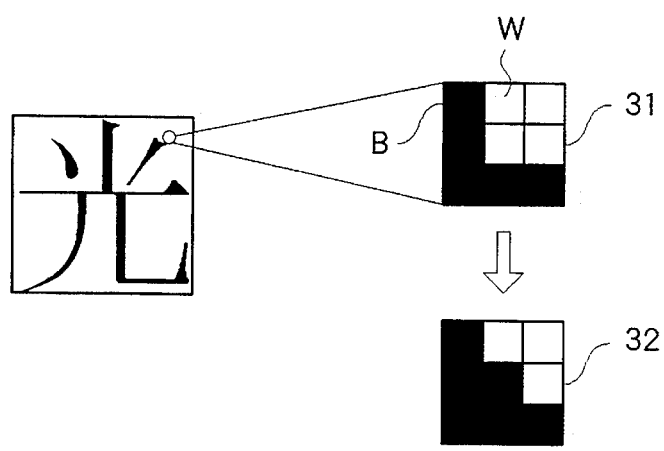
FIG. 4 is a view which serves to illustrate the contents of a filtering process.
Figure 5:
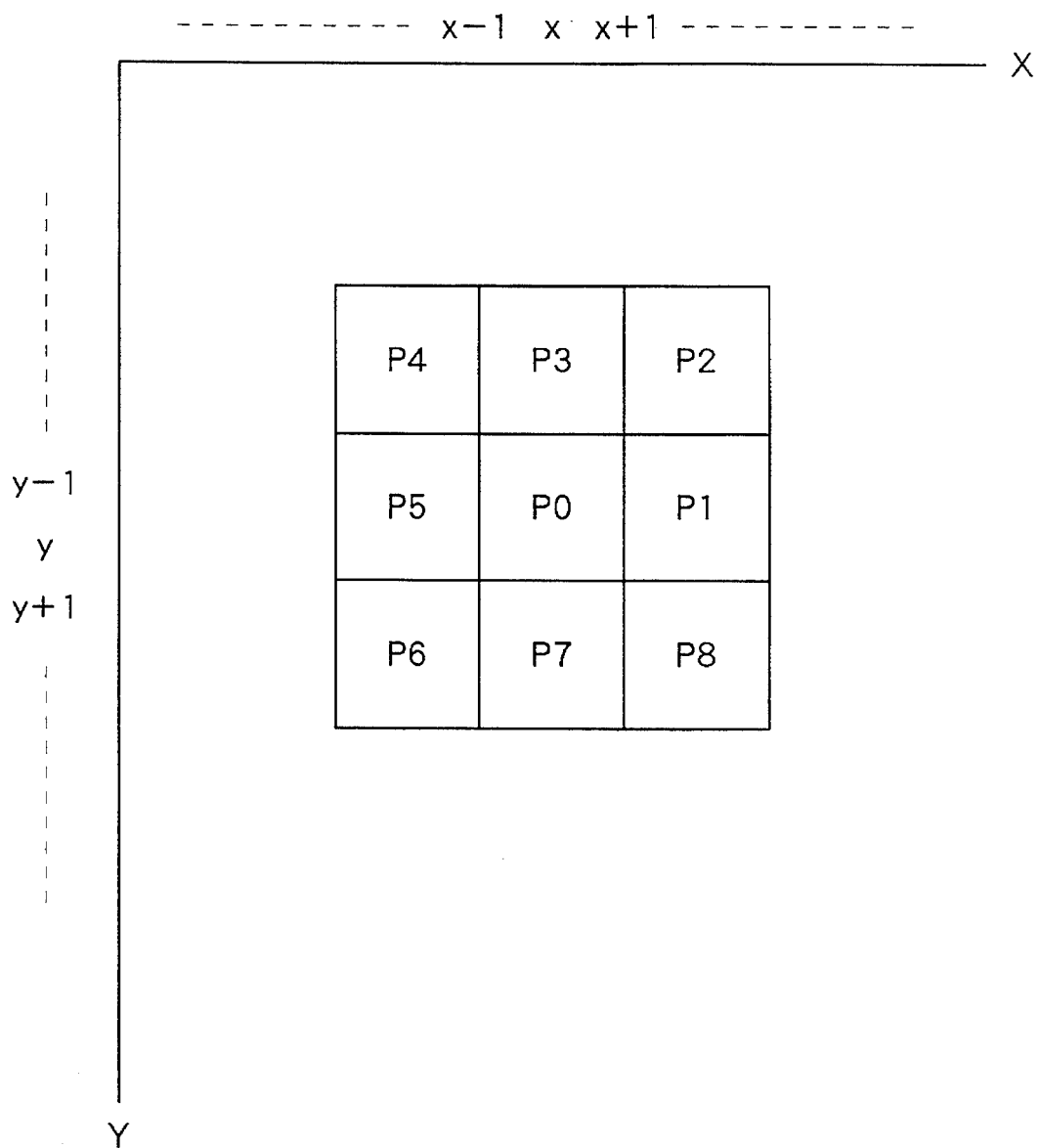
FIG. 5 is a view which serves to illustrate the positional relationship between a pixel p(x, y) and eight pixels which neighbor on the pixel p(x, y)
Figure 6:
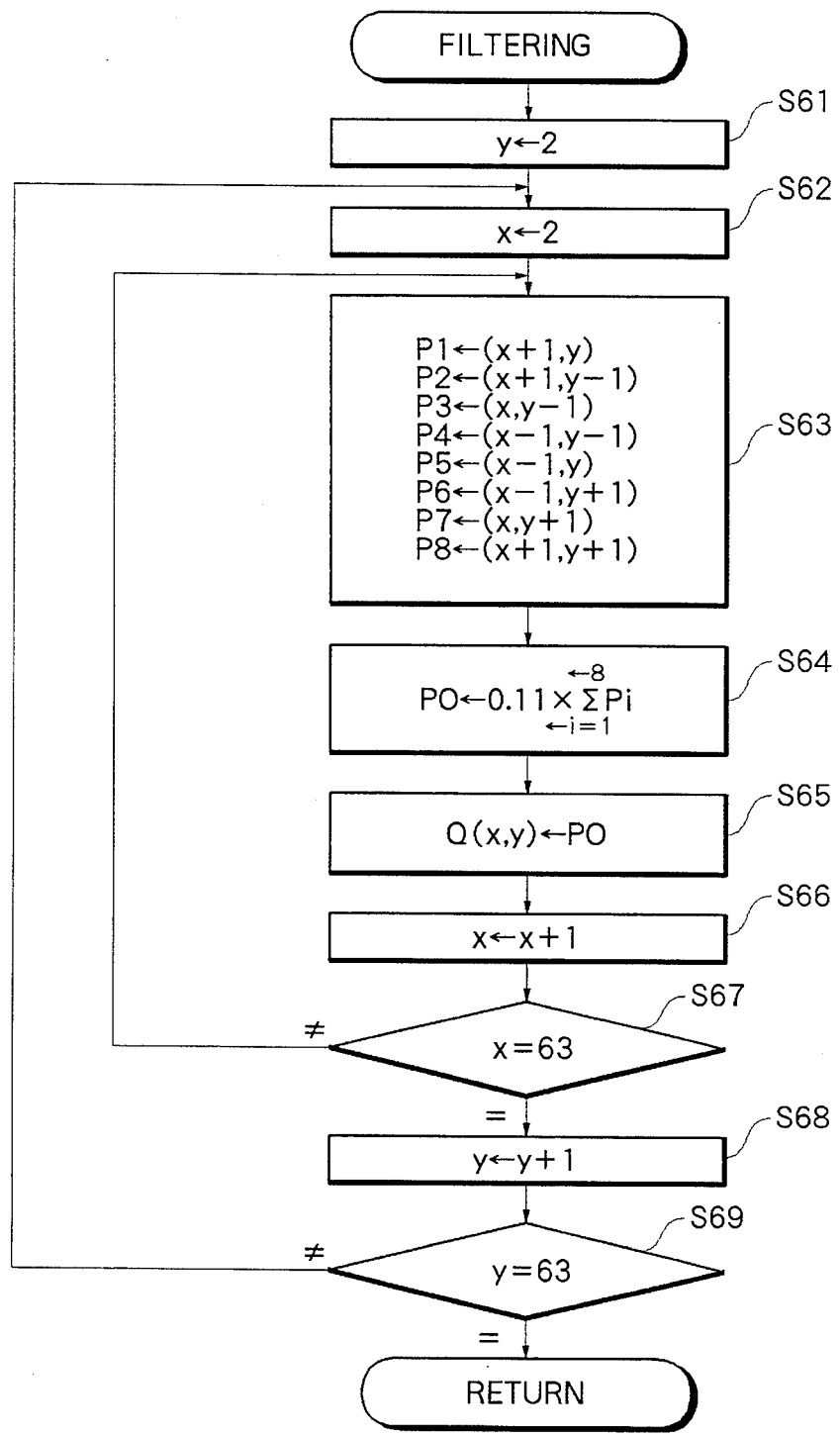
FIG. 6 is a flow chart showing the algorithm of a conventional filtering process.
Figure 7:
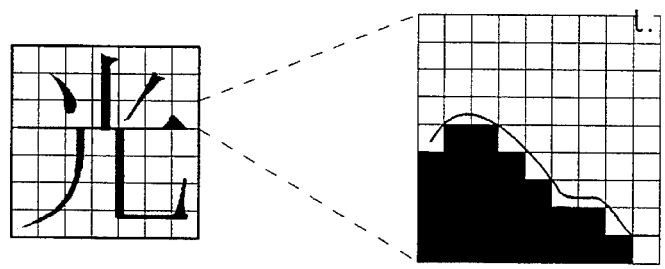
FIG. 7 is a view showing an outline portion which defines a black-pixel area of a character image.
Figure 8:
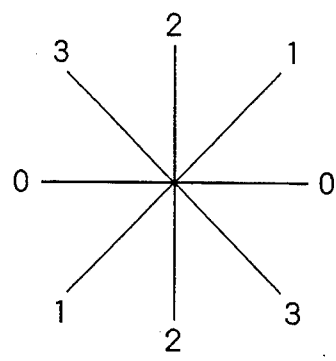
FIG. 8 is a view showing the directions indicated by direction index "0", "1", "2" and "3"
Figure 9:
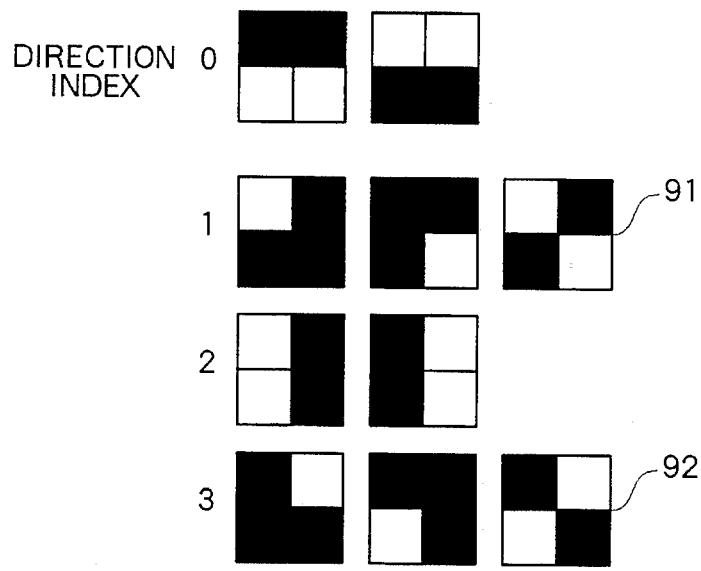
FIG. 9 is a view showing typical 2×2 pixel patterns from which the direction indexes are obtained.
Figure 10A:
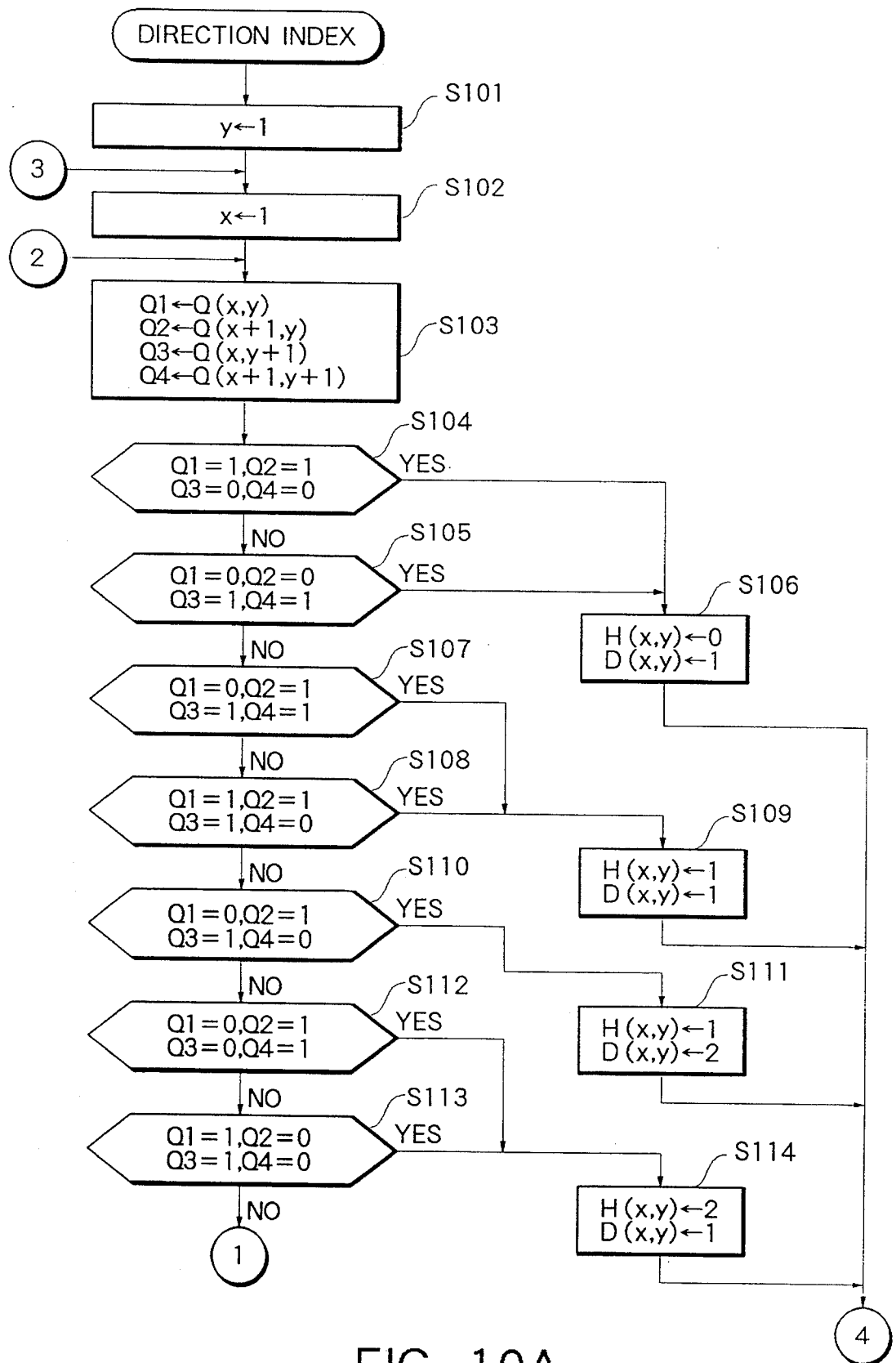
FIGS. 10A and 10B are flow charts showing a conventional algorithm used for calculating direction indexes.
Figure 10B:
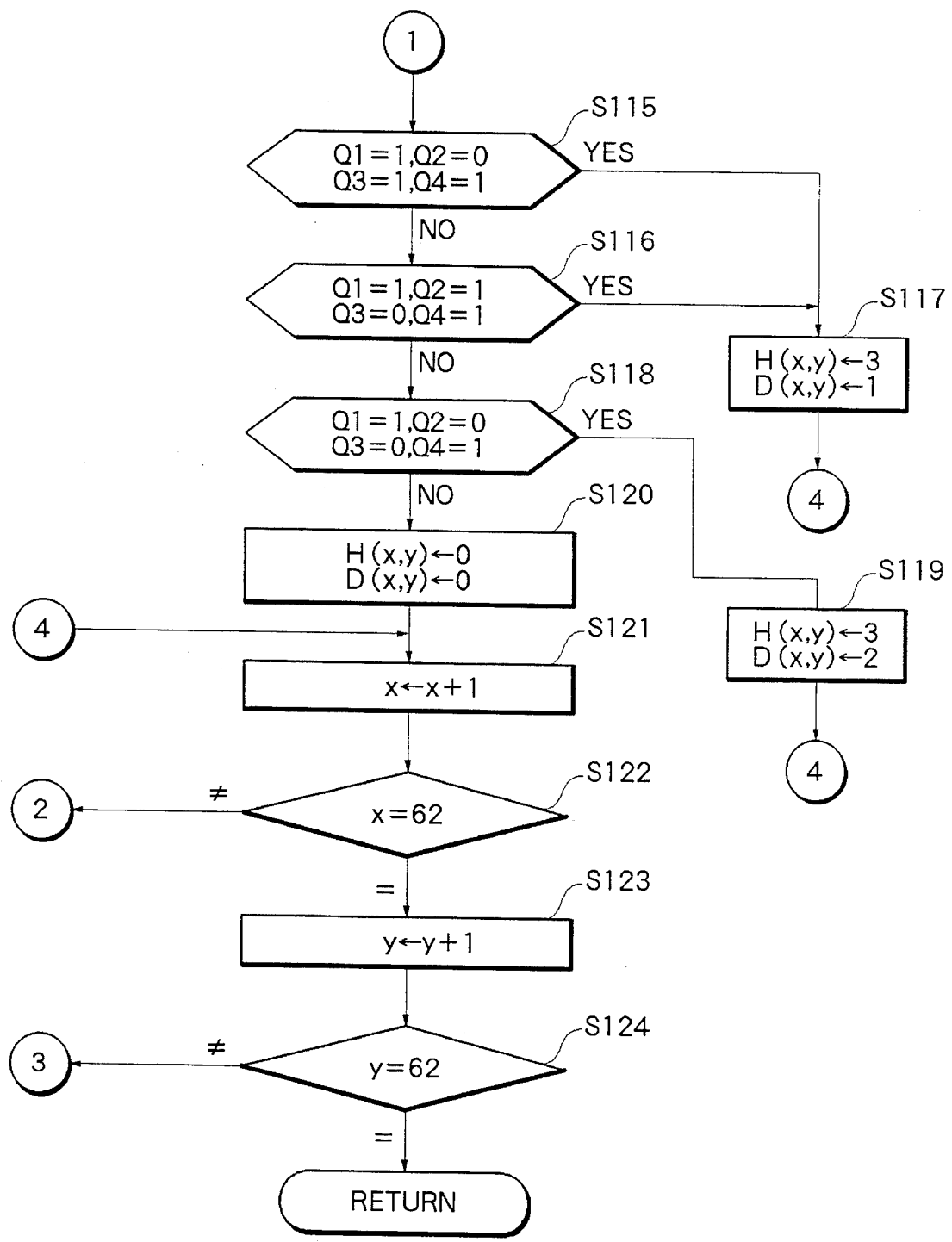
Figure 11:
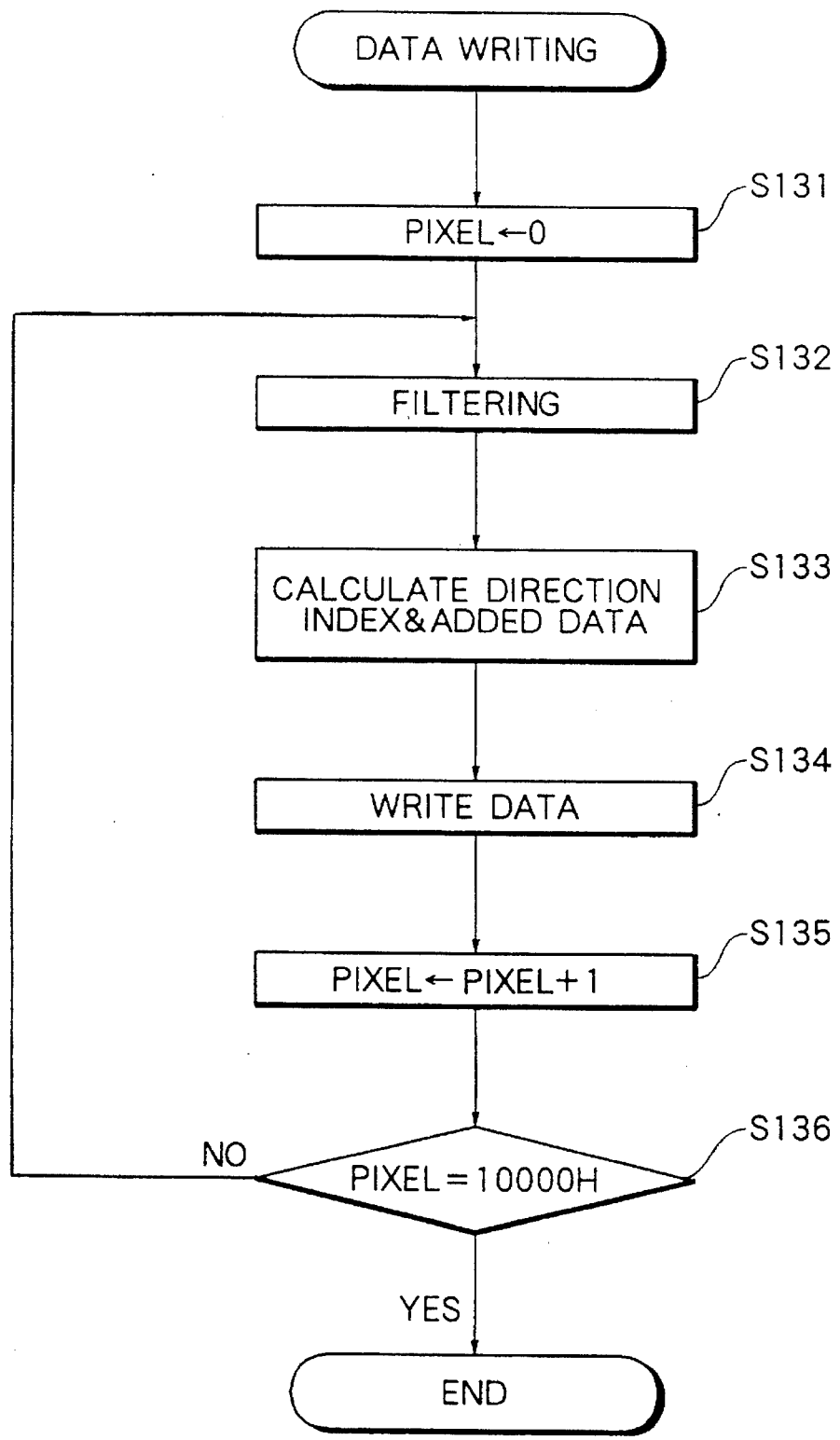
FIG. 11 is a flow chart showing an algorithm used for writing data to a blank ROM to make a decoding ROM.

The data memorized in the decoding ROM 7 is calculated from the value of the 4×4 pixels in accordance with the algorithm shown in FIG. 11. By way of example, reference is made to the operation of a PROM 27512. In this PROM, the counters 8–13 are connected to data buses $D_0$–$D_5$ of the PROM 27512, respectively. Sixteen address terminals $A_{15}$, $A_{14}$, . . . , $A_1$ and $A_0$ are connected to associated shift registers, and correspond to the pixels $P_0$, $P_1$, $P_2$, . . . , $P_{15}$ shown in FIG. 12A. For example, a pattern consisting of the 4×4 pixels of FIG. 12B assumes 3264H which is a hexadecimal address value. This 4×4 pixel pattern is subjected to a filtering processing similar to that explained in conjunction with FIG. 4, thereby effecting correction of black and white pixels, in Step S132. Then, in the feature extracting circuit according to this embodiment, the number of patterns corresponding to each direction index is calculated in accordance with an algorithm similar to that shown in FIG. 10, in Step S133.

Figures 12A, 12B, 13:
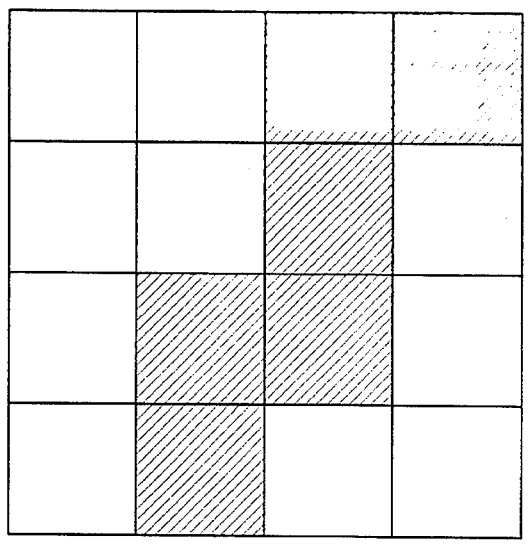
FIG. 12A is a view showing a 4×4 pixel block.
FIG. 12B is a view showing a display example of a 4×4 pixel block.
FIG. 13 is a view which serves to illustrate the operation of each counter with respect to direction indices H and added data D.

FIG. 13 shows counters which are set to an enable mode in accordance with the direction index H and the added data D.

If the direction index H=1 and the added data D=2, the counter 9 and the counter 10 perform counting operations so that the binary number "011000" is written in the blank ROM. In this binary number, "1" and "0" represent "enable" and "disable". The above calculations are performed with respect to each address 0H to FFFFH, by repeating from Step S132 to Step S136, and the obtained ROM data may be written in the blank ROM to make the decoding ROM 7, in Step S134.

Figure 14:
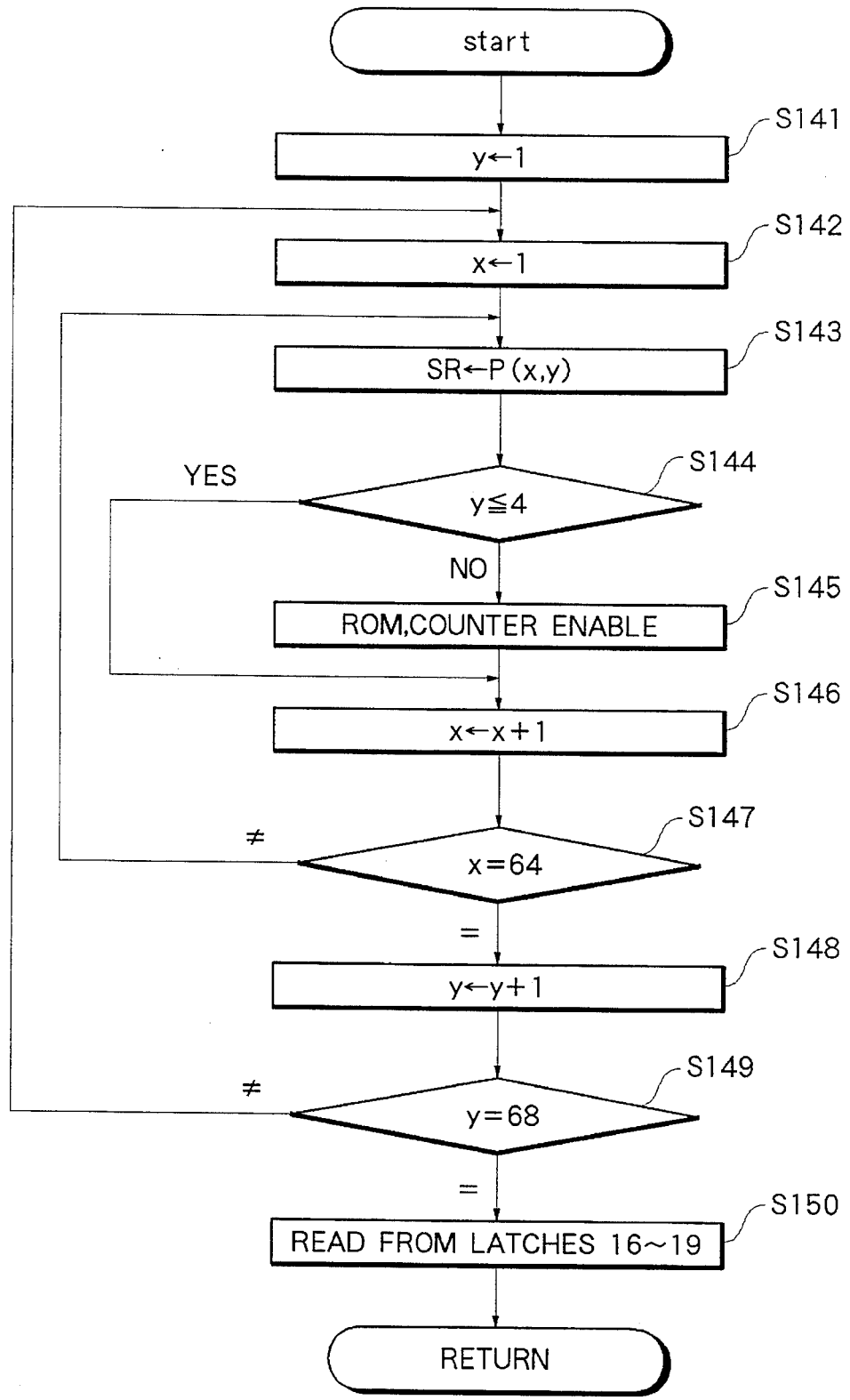
FIG. 14 is a flow chart showing the sequence in which steps are executed in the embodiment of FIG. 1.

The operation of the above embodiment of a feature extracting circuit according to the present invention is explained with reference to the block diagram of FIG. 1, which shows this embodiment, and the flow chart of FIG. 14.

First of all, in Step S141, the value of the y coordinate is initialized with "1" and then in Step S142, the value of the x coordinate is initialized with "1". In Step S143, the value P(x, y) of a pixel located at coordinates (x, y) is read from the RAM 3, and is then written to the shift registers 6. Since no pixel data corresponding to the first four lines (y=1, 2, 3 and 4) is prepared in the shift registers 6, the process jumps from Step S144 to Step S146, where the value of the x coordinate is incremented by one. The operation of writing pixel data to the shift registers 6 is repeated until the value of the x coordinate reaches "64".

If the value of the y coordinate reaches "5" (y≧5), after writing to the shift registers 6 has been completed in Step S143, the process proceeds to Step S145, where a ROM enable signal is set to enable mode. When the ROM enable signal is set to its enable mode, the output of the ROM 2 changes from its high-impedance state to a value which has previously been written in, whereby the counters 8–13 are actuated in accordance with the direction index H and the added data D.

The outputs of the counters 8 and 11 are supplied to the latches 16 and 18, respectively. The outputs of the counters 9 and 10 are added by the adder 14 and supplied to the latch 17. Likewise, the outputs of the counters 12 and 13 are added by the adder 15 and supplied to the latch 19. In this manner, the direction indexes H "0", "1", "2" and "3" are held in the respective latches 16–19.

Then, in Step S148, the value of the horizontal coordinate y is incremented by one and the process returns through Step S149 to Step S142, where the above-described process is performed. This process is repeated until the value of the horizontal coordinate y exceeds 67. When 67 is exceeded, the sums of the direction indexes "0"–"3" of each of the 63×63 pixels of the character image are held in the latches 16 and 19, respectively. Then, the process proceeds to Step S150, where the values of the respective latches 16–19 are read out so that the feature amount of the image is obtained.

Since the process executed in Steps S143–S146 is merely writing to the shift registers 6, the number of steps to be used in the program is only three to five or thereabouts, whereby the speed of feature extraction is increased.

Figure 15:
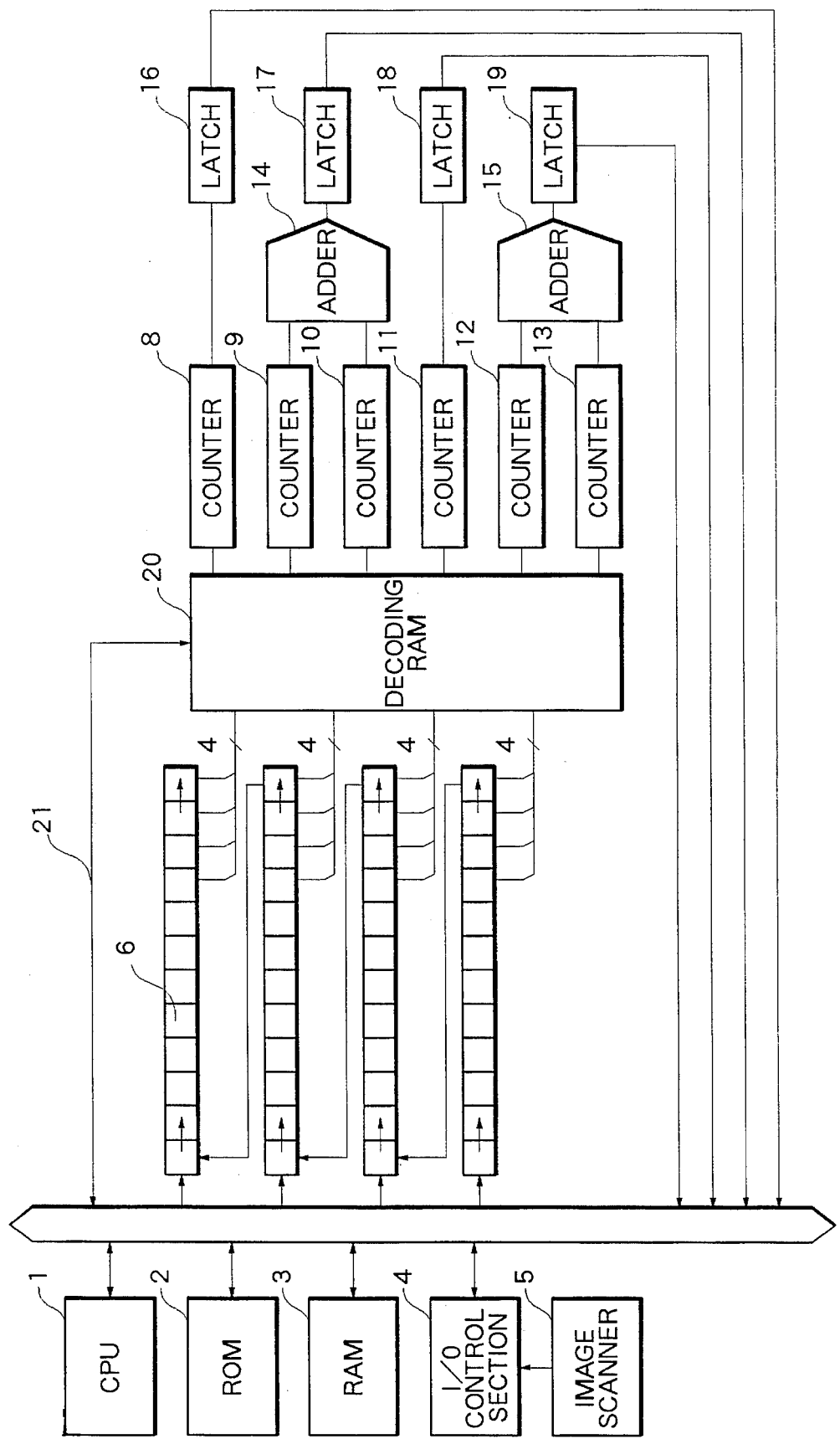
FIG. 15 is a block diagram showing another embodiment of a feature extracting circuit which employs a dual port memory in place of the decoding ROM.

Although the above embodiment employs a decoding ROM as a look-up table, a look-up table consisting of a general logic IC may be employed. A RAM may also be employed as the look-up table and data may be written in the RAM before the operation of the circuit is started. FIG. 15 shows another embodiment employing a dual port RAM 20 which is independently provided with address and data buses.

In this embodiment, data based on another filtering algorithm can be transferred from the CPU 1 to the RAM 20 over a bus 21. Accordingly, by effecting filtering of the type which matches an image on each document, appropriate feature extraction can be performed.

As is apparent from the foregoing, with the feature extracting circuit according to either of the embodiment described above, it is possible to effect feature extraction of an image at improved speeds, whereby the processing speed of character recognition, pattern recognition or the like is increased.

What is claimed is:

1. A feature extracting circuit arranged to receive a binary digital image and then to extract as a feature of the image a direction index which indicates the direction in which a boundary between adjacent black and white pixels extends, said feature extraction circuit comprising:

shift register means having m shift registers and arranged to store and then shift a partial image of m rows, m being a first predetermined number equal to or more than a number of rows of a first matrix necessary to form a predetermined number of filtering matrices in a row direction, said number of filtering matrices in the row direction being equal to a number of rows of a second matrix necessary to decide at least one direction index;

transforming means for receiving simultaneously a set of image data in a rectangular area defined by m rows×n columns which is formed from the first n data of each of said m shift registers, n being a second predetermined number equal to or more than a number of columns of the first matrix necessary to form a predetermined number of filtering matrices in a column direction, said number of filtering matrices in the column direction being equal to a number of columns of the second matrix, for filtering the set of image data to make a new set of image data and transforming the new set of image data into at least one direction index, at one time, and then outputting the direction index corresponding to the set of image data, defined by m rows×n columns, taken out from the received binary digital image by said m shift registers;

counting means for counting respectively a plurality of direction indices output from said transforming means.

2. A feature extracting circuit according to claim 1, wherein said transforming means is so structured and arranged that, in said filtering process, a datum of a pixel currently being processed is determined on the basis of data of a 3×3 array including that pixel currently being processed and surround pixels.

3. A feature extracting circuit according to claim 2, wherein said transforming means is so structured and arranged that, in said transforming process, the direction index is determined on the basis of data of a 2×2 array of pixels determined through said filtering process.

4. A feature extracting circuit according to claim 3, wherein said transforming means includes one look-up table performing said transforming and filtering process at one time on the basis of data of a 4×4 array of pixels.

5. A feature extracting method for receiving a binary digital image and then extracting as a feature of the image a direction index which indicates a direction in which a boundary between adjacent black and white pixels extends, said feature extraction method comprising the steps of:

storing and then shifting a partial image of m rows in a shift register means having m shift registers, m being a first predetermined number equal to or more than a number of rows of a first matrix necessary to form a predetermined number of filtering matrices in a row direction, said number of filtering matrices in the row direction being equal to a number of rows of a second matrix necessary to decide at least one direction index;

receiving simultaneously a set of image data in a rectangular area defined by m rows×n columns which is formed from the first n data of each of the m shift registers, n being a second predetermined number equal to or more than a number of columns of the first matrix necessary to form a predetermined number of filtering matrices in a column direction, the number of filtering matrices in the column direction being equal to a number of columns of the second matrix;

filtering the set of image data to make a new set of image data and transforming the new set of image data into at least one direction index, at one time, and then outputting the direction index corresponding to the set of image data, defined by m rows×n columns, taken out from the received binary digital image by said m shift registers; and counting respectively a plurality of direction indices output in said transforming step.

6. An image processing method comprising the steps of:

storing binary image data;

registering an image of m rows using m shift registers, m being a first predetermined number equal to or more than a number of rows of a first matrix necessary to form a predetermined number of filtering matrices in a row direction, said number of filtering matrices in the row direction being equal to a number of rows of a second matrix to decide at least one direction index;

transmitting the binary image data stored in the storing step one by one to one shift register;

shifting, in said registering step, image data from the one shift register to another shift register;

extracting a set of image data defined by m rows×n columns which is formed from the first n data of each of the m shift registers, n being a second predetermined number equal to or more than a number of columns of the first matrix necessary to form a predetermined number of filtering matrices, the number of filtering matrices in the column direction being equal to a number of columns of the second matrix, and repeating the extraction in said extracting step and the shifting in said shifting step, until the last row of the stored image data is input into said shift register means, wherein, in said extracting step, the set of image data is filtered to make a new set of image data and the new set of image data is transformed into at least one direction index at one time, and then outputting the at least one direction index corresponding to the set of image data, defined by m rows×n columns, taken out from the stored binary digital image by said m shift registers.

7. The method of claim 6, wherein, in said extracting step, one look-up table is used for performing the transforming and filtering processes at the one time.

8. The method of claim 6, wherein, in the filtering process, a datum of a pixel currently being processed is determined on the basis of data of that pixel currently being processed and surrounding pixels.

9. A method according to claim 6, wherein, in the transforming process, the direction index is determined on the basis of data of a 2×2 array of pixels determined through the filtering process.

10. The method of claim 6, further comprising the step of counting respectively a plurality of direction indices output in said extracting step.

11. A feature extracting circuit arranged to receive a binary digital image and then to extract as a feature of the image at least one direction index which indicates a direction in which a boundary between adjacent black and white pixels extends, said feature extracting circuit comprising:

shift register means having m shift registers and arranged to store and then shift a partial image of m rows, m being a first predetermined number equal to or more than a number of rows of a first matrix necessary to form a predetermined number of smoothing matrices in a row direction, said number of smoothing matrices in the row direction being equal to a number of rows of a second matrix to decide at least one direction index;

transforming means for receiving simultaneously a set of image data in a rectangular area defined by m rows×n columns which is formed from the first n data of each of said m shift registers, n being a second predetermined number equal to or more than a number of columns of the matrix necessary to form a predetermined number of smoothing matrices in a column direction, said number of smoothing matrices in the column direction being equal to a number of columns of the second matrix, for converting directly the set of image data into at least one direction index, by a table lookup means where the table contains the result of smoothing the set of image data to make a new set of image data and transforming the new set of image data into said at least one direction index, and outputting the at least one direction index corresponding to the set of image data, defined by m rows×n columns, taken out from the received binary digital image by said m shift registers; and counting means for counting respectively a plurality of direction indices output from said transforming means.

12. A feature extracting method for receiving a binary digital image and then extracting as a feature of the image at least one direction index which indicates a direction in which a boundary between adjacent black and white pixels extends, said feature extraction method comprising the steps of:

storing and then shifting a partial image of m rows in shift register means having m shift registers, m being a first predetermined number equal to or more than a number of rows of a first matrix necessary to form a predetermined number of smoothing matrices in a column direction, said number of smoothing matrices in the column direction being equal to a number of rows of a second matrix to decide the at least one direction index;

receiving simultaneously a set of image data in a rectangular area defined by m rows×n columns which is formed from the first n data of each of the m shift registers, n being a second predetermined number equal to or more than a number of columns of the first matrix necessary to form the predetermined number of matrices in the column direction, the number of smoothing matrices in the column direction being a number of columns of the second matrix;

converting directly the set of image data into the at least one direction index, by a table lookup means where the table contains the result of smoothing the set of image data to make a new set of image data and transforming the new set of image data into said at least one direction index, and then outputting the at least one direction index corresponding to the set of image data, defined by m rows×n columns, taken out from the received binary digital image by said m shift registers; and counting respectively a plurality of direction indices output in said transforming step.

13. An image processing method comprising the steps of:

storing binary image data;

registering an image of m rows using m shift registers, m being a first predetermined number equal to or more than a number of rows of a first matrix necessary to form a predetermined number of smoothing matrices in a row direction, the number of smoothing matrices in the row direction being equal to a number of rows of a second matrix to decide at least one direction index;

transmitting the binary image data stored in said storing step one by one to one shift register;

shifting, in said registering step, image data from the one shift register to another shift register;

extracting a set of image data defined by m rows×n columns which is formed from the first n data of each of the m shift registers, n being a second predetermined number equal to or more than a number of columns of the first matrix necessary to form a predetermined number of filtering matrices in a column direction, the number of filtering matrices in the column direction being equal to a number of columns of the second matrix, wherein the set of image data is directly converted to at least one direction index corresponding to the set of image data, defined by m rows×n columns, taken out from the stored binary digital image by said m shift registers by a table lookup means where the table contains the result of smoothing the set of image data to make a new set of image data and transforming the new set of image data into the at least one direction index; and repeating the extraction in said extracting step and the shifting in said shifting step, until the last row of the stored image data is input into the one shift register.

14. A feature extracting circuit arranged to receive a binary digital image and then to extract as a feature of the image at least one direction index which indicates a direction in which a boundary between adjacent black and white pixels extends, said feature extracting circuit comprising:

shift register means having m shift registers and arranged to store and then shift a partial image of m rows, m being a first predetermined number equal to or more than a number of rows of a first matrix necessary to form a predetermined number of smoothing matrices in a row direction, said number of smoothing matrices in the row direction being equal to a number of rows of a second matrix, to decide at least one direction index;

first transforming means for receiving simultaneously a set of image data in a rectangular area defined by m rows×n columns which is formed from the first n data of each said m shift registers, n being a second predetermined number equal to or more than a number of columns of the matrix necessary to form a predetermined number of smoothing matrices in a column direction, said number of smoothing matrices in the column direction being equal to a number of columns of the second matrix, for converting directly the set of image data into at least one boundary index representing direction and a boundary number, by a table lookup means where the table contains the result of smoothing the set of image data to make a new set of image data, and transforming the new set of image data into the at least one boundary index, and then outputting the boundary index corresponding to the set of image data, defined by m rows×n columns, taken out from the received binary digital image by said m shift registers; and second transforming means for receiving a predetermined type of boundary indices output from said first transforming means and transforming the predetermined type of boundary indices into a predetermined direction index; and counting means for counting respectively a rest of the boundary indices not transformed by said first transforming means and the direction indices transformed by said second transforming means, and outputting a count of the boundary indices and of the direction indices as a feature of the image.

15. A feature extracting method for receiving a binary digital image and then extracting as a feature of the image at least one direction index which indicates a direction in which a boundary between adjacent black and white pixels extends, said feature extraction method comprising the steps of:

storing and then shifting a partial image of m rows in shift register means having m shift registers m being a first predetermined number equal to or more than a number of rows of a first matrix necessary for form a predetermined number of smoothing matrices in a column direction, said number of smoothing matrices in the column directing being equal to a number of rows of a second matrix, to decide the at least one direction index;

receiving simultaneously a set of image data in a rectangular area defined by m rows×n columns which is formed from the first n data of each of the m shift registers, n being a second predetermined number equal to or more than a number of columns of the first matrix necessary to form the predetermined number of smoothing matrices in the column direction, the number of smoothing matrices in the column direction being equal to a number of columns of the second matrix;

converting directly the set of image data into at least one boundary index representing direction and a boundary number, by a table lookup means where the table contains the result of smoothing the set of image data to make a new set of image data, and transforming the new set of image data into the at least one boundary index, and then outputting the boundary index corresponding to the set of image data, defined by m rows×n columns, taken out from the received binary digital image by said m shift registers; and transforming a predetermined type of output boundary indices into a predetermined direction index, counting the boundary indices not transformed into a predetermined direction index and the transformed direction indices, and outputting a count of the boundary indices and of the direction indices as a feature of the image.

* * * * *

UNITED STATES PATENT AND TRADEMARK OFFICE
CERTIFICATE OF CORRECTION

PATENT NO. : 5,490,224

DATED : February 6, 1996

INVENTOR(S) : Masami Ogawa

It is certified that error appears in the above-indentified patent and that said Letters Patent is hereby corrected as shown below:

COLUMN 1

Line 11, "figure" should read --future--.
Line 31, "form of a" should be deleted and "two-dimensional" should read --form of a two-dimensional--,
Line 39, "place" should read --placed--, and
Line 57, "and" should be deleted.

COLUMN 2

Line 4, "on" should be deleted, and
Line 20, "p(x+ 1,y+1)" should read --P(x+1,y+1)--.

COLUMN 3

Line 29, "thereabouts" should read --thereabouts,--.

COLUMN 6

Line 29, "embodiment" should read --embodiments--, and
Line 64, "registers;" should read --registers; and--.

UNITED STATES PATENT AND TRADEMARK OFFICE
CERTIFICATE OF CORRECTION

PATENT NO.   : 5,490,224
DATED        : February 6, 1996
INVENTOR(S)  : Masami Ogawa It is certified that error appears in the above-indentified patent and that said Letters Patent is hereby corrected as shown below:

COLUMN 10

```
Line 16, "each" should read --each of--,
Line 55, "registers m" should read --registers, m--,
Line 57, "for" should read --to--, and
Line 61, "directing" should read --direction--.
```

Signed and Sealed this

Eighth Day of October, 1996

Attest:

BRUCE LEHMAN

Attesting Officer    Commissioner of Patents and Trademarks